(12) United States Patent
Takeda et al.

(10) Patent No.: US 12,117,379 B2
(45) Date of Patent: Oct. 15, 2024

(54) SAMPLE DISPERSING DEVICE AND SAMPLE DISPERSING METHOD

(71) Applicant: HORIBA, Ltd., Kyoto (JP)

(72) Inventors: Aya Takeda, Kyoto (JP); Seiji Higuchi, Kyoto (JP); Kusuo Ueno, Kyoto (JP)

(73) Assignee: HORIBA, LTD., Kyoto (JP)

( * ) Notice: Subject to any disclaimer, the term of this patent is extended or adjusted under 35 U.S.C. 154(b) by 400 days.

(21) Appl. No.: 17/318,582

(22) Filed: May 12, 2021

(65) Prior Publication Data

US 2021/0356365 A1    Nov. 18, 2021

(30) Foreign Application Priority Data

May 15, 2020 (JP) .................................. 2020-086003
Mar. 24, 2021 (JP) .................................. 2021-049914

(51) Int. Cl.
*G01N 1/00*        (2006.01)
*G01N 1/28*        (2006.01)
*G01N 1/38*        (2006.01)

(52) U.S. Cl.
CPC ............. *G01N 1/2813* (2013.01); *G01N 1/38* (2013.01); *G01N 2203/0284* (2013.01)

(58) Field of Classification Search
CPC ............. G01N 1/38; G01N 2203/0284; G01N 2203/026; G01N 1/2813; G01N 1/28
See application file for complete search history.

(56) References Cited

U.S. PATENT DOCUMENTS

| 3,537,426 | A |   | 11/1970 | Spiller et al. |   |
|---|---|---|---|---|---|
| 3,590,888 | A | * | 7/1971  | Coleman | B65D 88/62 |
|   |   |   |   |   | 220/62.21 |
| 4,306,557 | A | * | 12/1981 | North | A61M 1/604 |
|   |   |   |   |   | 141/59 |
| 5,437,384 | A | * | 8/1995  | Farrell | B65D 19/12 |
|   |   |   |   |   | 220/9.4 |
| 5,507,602 | A |   | 4/1996  | Walker |   |

(Continued)

FOREIGN PATENT DOCUMENTS

| JP | 2001116668 A  | 4/2001 |
|---|---|---|
| JP | 2001-242062 A | 9/2001 |

(Continued)

OTHER PUBLICATIONS

WO2019050035A1 translated (Year: 2019).*

(Continued)

*Primary Examiner* — Matthew D Krcha
*Assistant Examiner* — Tingchen Shi
(74) *Attorney, Agent, or Firm* — LUCAS & MERCANTI, LLP

(57) ABSTRACT

The present claimed invention shortens cleaning time of a container of a sample dispersing device and reduces variation of a cleaning state. The present claimed invention is a sample dispersing device 100 that disperses a powder sample (W) on an upper surface of an analytical member 10 and that comprises a container 2 that has a placing surface 2x on which the analytical member 10 is placed, an introducing mechanism 3 that introduces the powder sample (W) into inside of the container 2, and a covering member 4 that covers an inner surface of the container 2 and that can be attached to and removed from the container 2.

9 Claims, 6 Drawing Sheets

(56) References Cited

U.S. PATENT DOCUMENTS

| | | | |
|---|---|---|---|
| 6,102,562 A | | 8/2000 | Bengtson |
| 2010/0326213 A1* | | 12/2010 | Davidson ............... G01N 1/286 |
| | | | 73/863.41 |
| 2011/0120368 A1 | | 5/2011 | Chapeau et al. |
| 2015/0001212 A1* | | 1/2015 | Varbanov ............... B65D 77/06 |
| | | | 220/23.89 |
| 2016/0206293 A1* | | 7/2016 | Schiestle ................. G01N 1/38 |
| 2021/0088423 A1 | | 3/2021 | Nagura et al. |

FOREIGN PATENT DOCUMENTS

| | | | | |
|---|---|---|---|---|
| JP | 2009186332 A | | 8/2009 | |
| WO | WO-2019050035 A1 * | | 3/2019 | ............... G01N 1/28 |

OTHER PUBLICATIONS

EPO, European Search Report for the corresponding European patent application No. 21173848.9, dated Oct. 20, 2021.
Office Action dated Sep. 6, 2023 for the corresponding European patent application No. 21173848.9.
Office Action, dated Jul. 30, 2024, for the corresponding Japanese Patent Application No. 2021-049914, with English Translation.

* cited by examiner (A) FOLD COVERING MEMBER (B) INSERT FOLDED COVERING MEMBER (C) COVERING MEMBER IS FIXED TO INNER SURFACE OF SIDE WALL PORTION

SAMPLE DISPERSING DEVICE AND SAMPLE DISPERSING METHOD

CROSS REFERENCE TO RELATED APPLICATION

This claims priority of Japanese Patent Application No. 2020-086003 filed on May 15, 2020 and Japanese Patent Application No. 2021-049914 filed on Mar. 24, 2021, both applications are incorporated herein by reference.

FIELD OF THE ART

The present claimed invention relates to a sample dispersing device and a sample dispersing method for dispersing a powder sample on an analytical member.

BACKGROUND ART

Conventionally, in case of observing a powder sample with a microscope such as an electron microscope, a sample is prepared by dispersing the powder sample on an upper surface of an analytical member.

As a device to prepare the sample, as shown in the Patent document 1, there is a sampler dispersing device that introduces a powder sample into a container that houses a holding member (an analytical member) such as a glass plate and that attaches the powder sample dispersed in the container to the holding member.

For this type of the sample dispersing device, since the powder sample is scattered in all directions in the container and adheres to the inner surface of the container, it is necessary to conduct cleaning work such as washing with water or wiping in order to remove the particles that adheres to the inner surface of the container after use.

However, since it is necessary to conduct the above-mentioned cleaning work manually for each preparation of the powder sample, not only the cleaning work is time-consuming but also it is difficult to prepare the powder samples efficiently. In addition, there is a risk of confusion with other powder samples due to variations in the cleaning states among the workers who conduct the above-mentioned cleaning work.

PRIOR ART DOCUMENT

Patent Document

[Patent document 1] International Publication No. 2019/050035

OUTLINE OF THE INVENTION

Problem to be Solved by the Invention

The present claimed invention was made in consideration of the above-mentioned problems, and a main object of this invention is to shorten cleaning time of a container in a sample dispersing device and to reduce variations of the cleaning state.

More specifically, the sample dispersing device in accordance with this invention is a sample dispersing device for dispersing a powder sample on an upper surface of an analytical member, and is characterized by comprising a container that has a placing surface on which the analytical member is placed, an introducing mechanism that is arranged in the container and that introduces the powder sample into inside of the container, and a covering member that covers an inner surface of the container and that can be attached to and removed from the container.

In accordance with the above-mentioned sample dispersing device, since the covering member that covers the inner surface of the container is removable from the container, it is possible to easily clean the container by replacing the covering member after use. As a result of this, it is possible to shorten the cleaning time of the container of the sample dispersing device, and to efficiently prepare samples with powder samples dispersed on the analytical member. In addition, since a part covered by the covering member can be cleaned by replacing the covering member, it is possible to reduce the variation of the cleaning condition. Furthermore, since the cleaning can be conducted efficiently and without variation, it is possible to reduce the risk of confusion with other powder samples. In addition, it is also possible to reduce the risk of damage to the container during cleaning.

As a concrete embodiment of the container, conceived is that the container has a lower wall portion having the placing surface on its upper surface, an upper wall portion facing the lower wall portion, and a side wall portion connecting the lower wall portion and the upper wall portion and surrounding the placing surface.

In accordance with this arrangement, a ratio of the inner surface of the side wall portion to the inner surface of the container becomes relatively large. For this reason, in order to make the effect of providing the covering member in a detachable manner remarkably, it is preferable that the covering member covers at least an inner surface of the side wall portion.

In order both to facilitate the installation and the removal of the analytical member and to facilitate the replacement of the covering member with respect to the side wall portion, it is preferable that the container is configured so that at least the lower wall portion is separable from the side wall portion.

It is preferable that the covering member is made of an elastic body having a sheet shape and covers the inner surface of the side wall portion by being arranged in an elastically deformed state inside of the side wall portion.

In accordance with this arrangement, since the covering member is fixed in contact with the inner surface of the side wall portion by the elastic resilience of the covering member by elastically deforming the covering member into a cylindrical shape and placing it inside the side wall portion, it is possible to eliminate the need for a separate fixing mechanism for fixing the covering member. In addition, it is possible to facilitate the replacing work of the covering member.

Most of the scattered powder is deposited on the lower wall portion. For this reason, it is preferable that a discharging mechanism that sucks and discharges the powder sample is arranged on the lower wall portion.

In accordance with this arrangement, it is possible to reduce the burden of cleaning work by discharging the powder sample before the container is opened.

In order to make it possible to visually recognize the inside of the container, it is preferable that the covering member is made of a material having light transmittance.

As a concrete embodiment of the introducing mechanism, it is preferable that the introducing mechanism introduces a gas containing the powder sample into the container by means of a pressure difference between the inside and the outside of the container and has an introducing pipe through which the gas containing the powder sample flows and which is provided with a plurality of narrowed portions, and one or more mesh members arranged in the introducing pipe.

In accordance with this arrangement, since the mesh members are provided in the introducing tube, it is possible to subdivide the powder sample introduced into the container so that the powder sample can be efficiently dispersed inside of the container.

In addition, a sample dispersing method in accordance with this invention is a sample dispersing method using a sample dispersing device that has a container having a placing surface on which an analytical member is placed and an introducing mechanism that introduces a powder sample into the container, and is characterized by that the powder sample is introduced into the container by the introducing mechanism and dispersed on an upper surface of the analytical member in a state wherein an inner surface of the container is covered by a covering member that can be attached to and removed from the container.

Effect of the Invention

In accordance with the above-mentioned invention, the cleaning time of the container of the sample dispersing device can be shortened and the variation of the cleaning condition can be reduced.

BEST MODES FOR EMBODYING THE INVENTION

A sample dispersing device 100 in accordance with one embodiment of the present claimed invention will be described below with reference to drawings.

1. Device Configuration

The sample dispersing device 100 of this embodiment is to disperse a powder sample (W) on an upper surface of an analytical plate 10 as being an analytical member. The analytical plate 10 in this embodiment is a plate having a flat surface on its top. The analytical member is not limited to a plate-shaped plate, and various types of plates can be used according to the analytical device such as a microscope.

Figure 1:
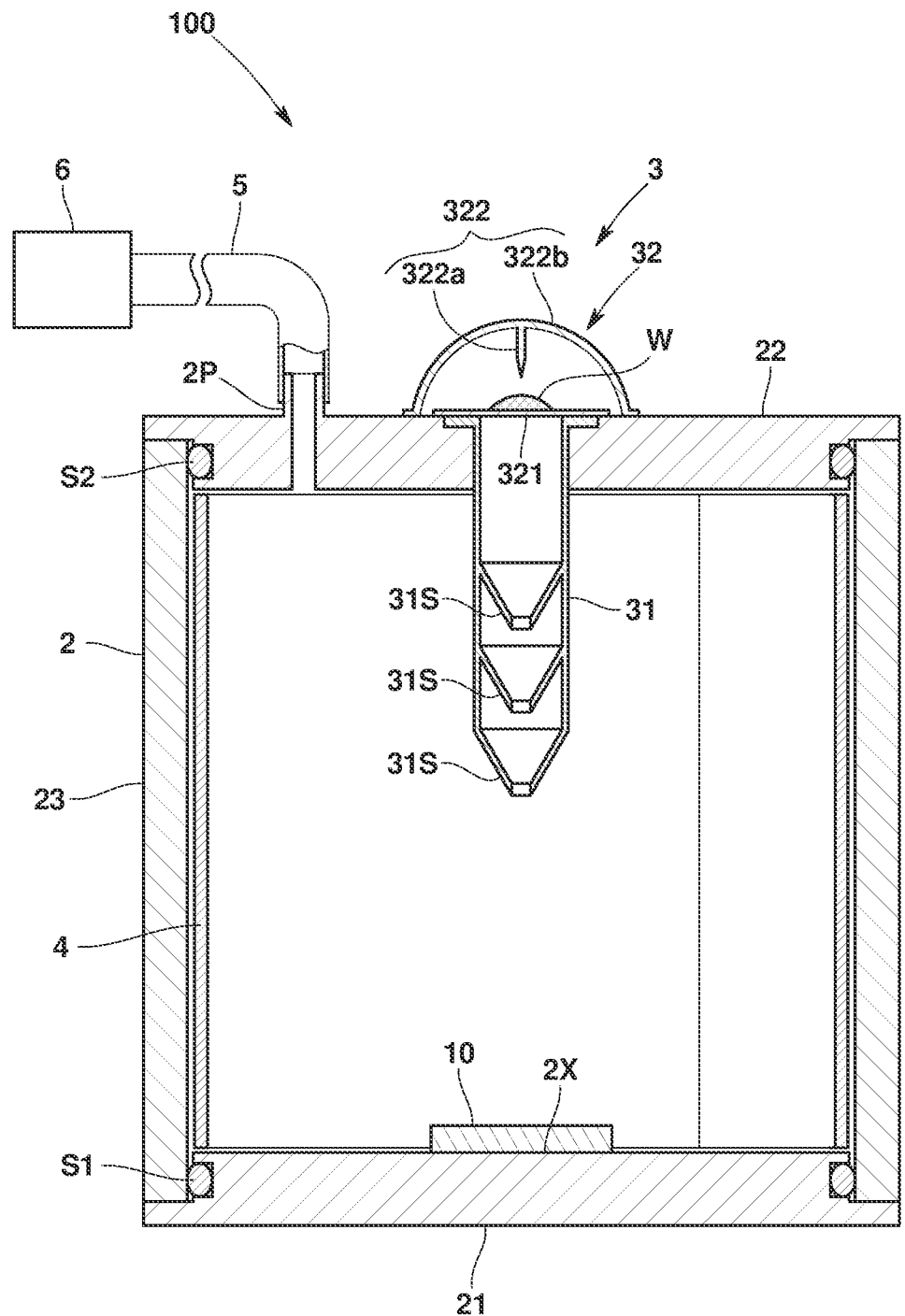
FIG. 1 Schematic diagram of a sample dispersing device in accordance with one embodiment of this invention.

Concretely, as shown in FIG. 1, the sample dispersing device 100 has a container 2 having a placing surface on which the analytical plate 10 is placed, an introducing mechanism 3 that is arranged in the container 2 and that introduces the powder sample (W) into inside of the container 2, and a covering member 4 that covers the inner surface of the container 2 and that is removable from the container 2.

The container 2 has a lower wall portion 21 having a placing surface 2x on its upper surface, an upper wall portion 22 facing the lower wall portion 21, and a side wall portion 23 connected to the lower wall portion 21 and the upper wall portion 22 and surrounding the placing surface 2x.

The lower wall portion 21 has a placing surface 2x on which the analytical plate 10 is placed and the placing surface 2x is set, for example, in a center of the lower wall portion 21. A placing stand on which the analytical plate 10 is placed is arranged in a center of the lower wall portion 21, and the upper surface of the placing stand may be used as the placing surface 2x.

The upper wall portion 22 is provided with an introducing mechanism 3 and the introducing mechanism 3 is arranged, for example, in a center portion of the upper wall portion 22. In addition, the upper wall portion 22 is provided with an exhaust port 2P to make the inside of the container 2 in vacuum, and the exhaust port 2P is connected to a pressure reducing pump 6 through piping 5. The pressure in the inside of the container 2 is reduced to a predetermined vacuum level by the pressure reducing pump 6. In addition, the upper wall portion 22 may be provided with an atmospheric opening port to open the inside of the container 2 to the atmosphere.

The side wall portion 23 has a cylindrical shape arranged between the lower wall portion 21 and the upper wall portion 22, and its lower end opening portion is closed by the lower wall portion 21 and its upper end opening portion is closed by the upper wall portion 22. The side wall portion 23 of this embodiment is made of a material having light transmittance (for example, quartz glass, acrylic glass, etc.) so that the interior part can be seen. The side wall portion 23 of this embodiment has a cylindrical shape.

The container 2 is configured so that at least the lower wall portion 21 can be separated from the side wall portion 23. In this embodiment, not only the lower wall portion 21 but also the upper wall portion 22 is configured to be separable from the side wall portion 23. The space between the side wall portion 23 and the lower wall portion 21 is made airtight through a sealing member S1 such as an O-ring, and the space between the side wall portion 23 and the upper wall portion 22 is also made airtight through a sealing member S2 such as an O-ring.

The introducing mechanism 3 introduces a gas containing the powder sample (W) into the container 2 by means of a pressure difference between the inside and the outside of the container 2.

Concretely, the introducing mechanism 3 comprises an introducing tube 31 through which the gas containing the powder sample (W) flows and a supplying portion 32 that supplies the powder sample (W) to the introducing tube 31.

The introducing tube 31 is arranged along the vertical direction while penetrating the upper wall portion 22 of the container 2. The introducing tube 31 is provided with a plurality of narrowed portions 31S between an upper end opening and a lower end opening of the introducing tube 31. The gas containing the powder sample (W) flowing through the introducing tube 31 is repeatedly compressed and expanded by the multiple narrowed portions 31S, and a shearing force is applied to a group of particles in an aggregated state to promote dispersion of the powder sample (W). The supplying portion 32 is arranged at the upper end opening of the introducing tube 31.

The supplying portion 32 comprises a partition membrane 321 that blocks the upper end opening of the introducing tube 31 and on which the powder sample (W) is placed and a membrane breaking portion 322 that breaks the partition membrane 321 and supplies the powder sample (W) to the introducing tube 31.

The partition membrane 321 has a strength that is substantially strong enough not to be broken even when the inside of the container 2 is depressurized, and is a thin film, for example, made of resin.

Figure 2:
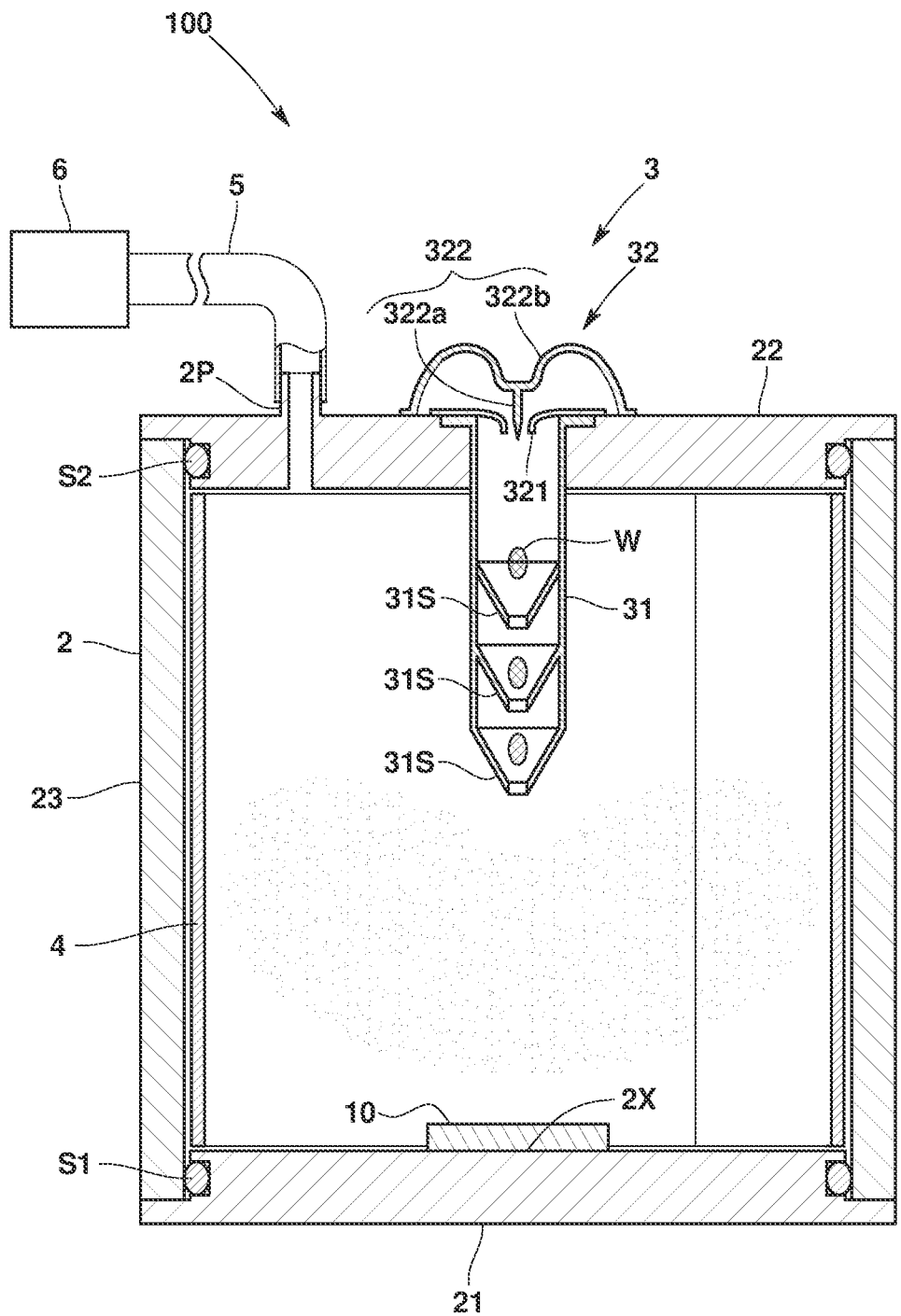
FIG. 2 Schematic diagram showing a state wherein a powder sample is dispersed in this embodiment.

The membrane breaking portion 322 is for breaking the partition membrane 321 in a state wherein inside of the container 2 is depressurized, and consists of, for example, a needle 322a. The needle 322a is fixed to an inner surface of an elastic body 322b that is roughly hemispherical in shape. The elastic body 322b is arranged in such a way that the needle 322a faces the partition membrane 321. When the elastic body 322b is in a natural state, the needle 322a is separated from the partition membrane 321. When the elastic body 322b is pushed downward, the needle 322a breaks the partition membrane 321 so that the powder sample (W) placed on the upper surface of the partition membrane 321 is introduced into the inside of the container 2 through the introducing tube 31 due to the pressure difference between the inside and the outside of the container 2 (refer to FIG. 2).

The covering member 4 covers at least the inner surface of the side wall portion 23 of the inner surface of the container 2. The covering member 4 of this embodiment is configured to cover generally the entire inner surface of the side wall portion 23. The covering member 4 is made of a light transmissive material (for example, a resin having light transmission characteristics) so that the inside of the container 2 can be seen. The covering member 4 may cover a part of the inner surface of the side wall portion 23. For example, it may cover a lower half of the inner surface of the side wall portion 23 and may cover the inner surface of the side wall portion 23 below the lower end of the introducing tube 31, or it may cover the part of the inner surface of the side wall portion 23 to which the powder sample (W) easily adheres.

Figure 3:
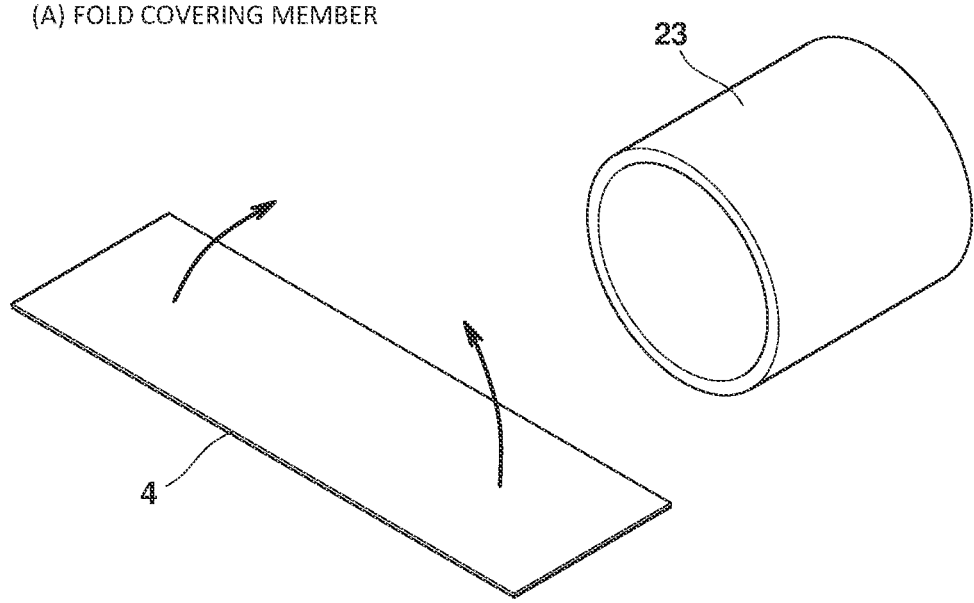
FIG. 3 A perspective view showing one example of a procedure for mounting a covering member in accordance with this embodiment.
Figure 3:
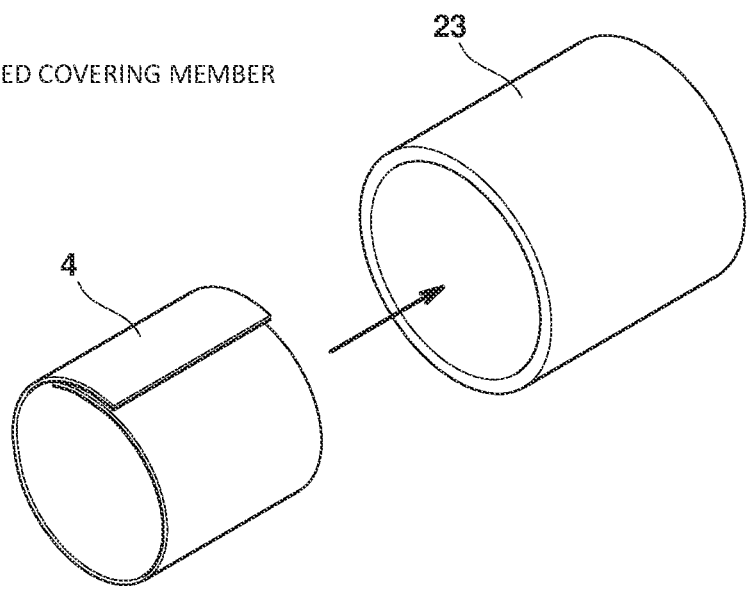
Figure 3:
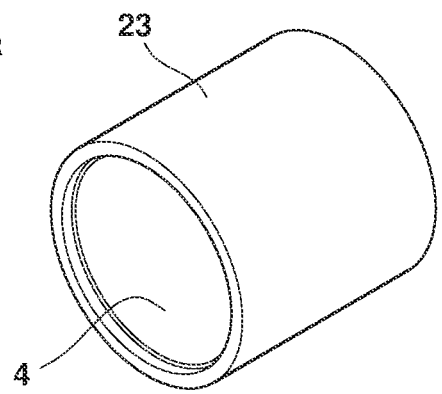

Concretely, the covering member 4 is composed of an elastic body having a sheet shape, as shown in FIG. 3. The covering member 4 is configured to cover the inner surface of the side wall portion 23 by being arranged in a cylindrically elastically deformed state inside of the side wall portion 23.

Here, the covering member 4 is arranged inside of the side wall portion 23 in a cylindrically elastically deformed state, and the covering member 4 expands due to its elastic return force so that the outer surface of the covering member 4 makes contact with the inner surface of the side wall portion 23. Since the side wall portion 23 has a cylindrical shape, the outer surface of the covering member 4 makes contact with generally whole part of the inner surface of the side wall portion 23.

A sample dispersing method using the sample dispersing device of this embodiment will be briefly explained.

First, the covering member 4 is mounted on the inside of the side wall portion 23. With this state kept, the lower wall portion 21 and upper wall portion 22 are mounted on the side wall portion 23, and the analytical plate 10 is placed on the placing surface 2x of the lower wall portion 21.

With this state kept, the powder sample (W) is introduced into the container 2 and the powder sample (W) is dispersed on the upper surface of the analytical plate 10 by the use of the introducing mechanism 3.

Subsequently, the lower wall portion 21 and upper wall portion 22 are dismounted from the side wall portion 23 and the analytical plate 10 is dismounted. In addition, the covering member 4 is dismounted from the inner surface of the side wall portion 23.

2. Effect of the Present Embodiment

In accordance with the sample dispersing device 100 of this embodiment having the above-mentioned arrangement, since the covering member 4 that covers the inner surface of the container 2 is detachable from the container 2, the cleaning work of the container 2 can be simplified by replacing the covering member 4 after use. As a result of this, it is possible to shorten the time required for cleaning the container 2 of the sample dispersing device 100, and to efficiently prepare the sample wherein the powder sample (W) is dispersed on the analytical plate 10. In addition, since a portion covered by the covering member 4 can be cleaned by replacing the covering member 4, it is possible to reduce the variation in the cleaning condition. Furthermore, since the cleaning can be done efficiently and evenly, it is possible to reduce the risk of confusion with other powder samples. In addition, it is also possible to reduce the risk of damage to the container 2 or deterioration of the container 2 during cleaning.

In addition, since the inner surface of the side wall portion 23 to which the powder sample (W) relatively easily adheres and that occupies a large proportion of the inner surface is covered with the covering member 4, it is possible to make the effect of having the covering member 4 removable furthermore conspicuous.

Furthermore, since the lower wall portion 21 is configured to be separable from the side wall portion 23, it is possible to facilitate installation and removal of the analytical plate 10 and to facilitate replacement of the covering member 4 with respect to the side wall portion 23.

In addition, since the covering member 4 is fixed in contact with the inner surface of the side wall portion 23 by its elastic return force just by elastically deforming the covering member 4 into a cylindrical shape and placing it inside of the side wall portion 23, it is possible to eliminate the need for an another separate fixing mechanism in order to fix the covering member 4. Furthermore, it is possible to facilitate an exchanging work of the covering member 4.

3. Other Embodiments

The present invention is not limited to the above-mentioned embodiments.

For example, the covering member 4 of the above-mentioned embodiment covers the inner surface of the side wall portion 23 of the container 2, but it may also cover the inner surface of the lower wall portion 21 or the inner surface of the upper wall portion 22 of the container 2.

In case of covering the inner surface of the lower wall portion 21 of the container 2, it may be configured to cover the inner surface excluding the placing surface 2x, or it may be configured to cover the entire inner surface including the placing surface 2x. In case of covering the entire inner surface including the placing surface 2x, the analytical plate 10 is placed on the covering member 4.

In addition, the above-mentioned covering member 4 may be in the form of a sheet or a bag, for example, and may cover both the inner surface of the side wall portion 23 and the inner surface of the lower wall portion 21.

Furthermore, the covering member 4 may be fixed to the inner surface of the container 2 using an adhesive or other fixing means.

The covering member 4 may be disposable or may be used repeatedly by washing. In case of a configuration wherein the sheet-shaped material is elastically deformed as in the above-mentioned embodiment, since the covering member 4 becomes sheet-shaped after removal, it becomes easy to clean the covering member 4.

As the introducing mechanism 3 of the powder sample (W), in addition to the decompression type as described in the above-mentioned embodiment, it may be a pressurized type that uses compressed air to introduce the powder sample (W) into the container 2, or it may be a free-fall type. In addition to the configuration of the introducing mechanism 3 arranged on the upper wall portion 22, it may also be installed on the lower wall portion 21, or on the side wall portion 23.

Figure 4:
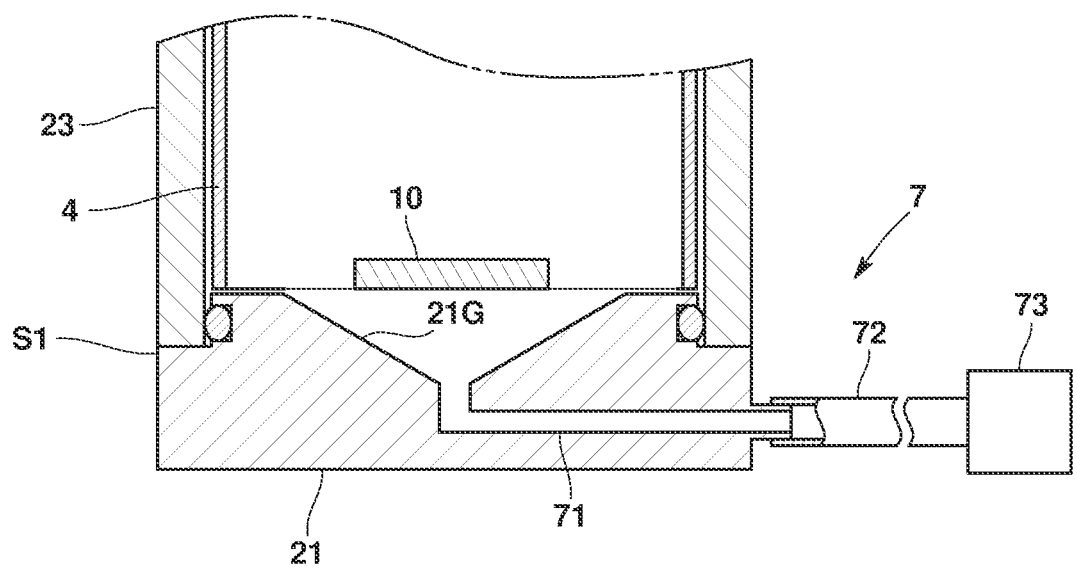
FIG. 4 A schematic diagram showing the sample dispersing device in accordance with a modified embodiment.

Furthermore, as shown in FIG. 4, a discharging mechanism 7 may be provided in the lower wall portion 21 of the container 2 to suck and discharge the powder sample (W). This discharging mechanism 7 may be provided with a function as a decompression pump of the above-mentioned embodiment.

Concretely, the discharging mechanism 7 comprises a discharging channel 71 arranged in the lower wall portion 21, an exhaust pipe 72 connected to the discharging channel 71, and a suction pump 73 arranged in the exhaust pipe 72. After the powder sample (W) is dispersed inside of the container 2 (after the container 2 is used), the suction pump 73 sucks and discharges the powder sample (W) deposited on the lower wall portion 21 from the discharging channel 71.

Here, in order to increase the efficiency of discharging the powder sample (W) by the discharging mechanism 7, a funnel-shaped guide surface 21G is formed on the inner surface of the lower wall portion 21 to guide the powder sample (W) toward the discharging channel 71. By making the guide surface 21G funnel-shaped, it is possible to prevent the powder sample (W) from flying up. In addition, it is also preferable to open the inside of the container 2 to the atmosphere before discharging the powder sample (W) by the discharging mechanism 7. Furthermore, a filter to remove the powder sample (W) may be arranged upstream of the suction pump 73 in the discharging channel 71 or the exhaust pipe 72.

Figure 5:
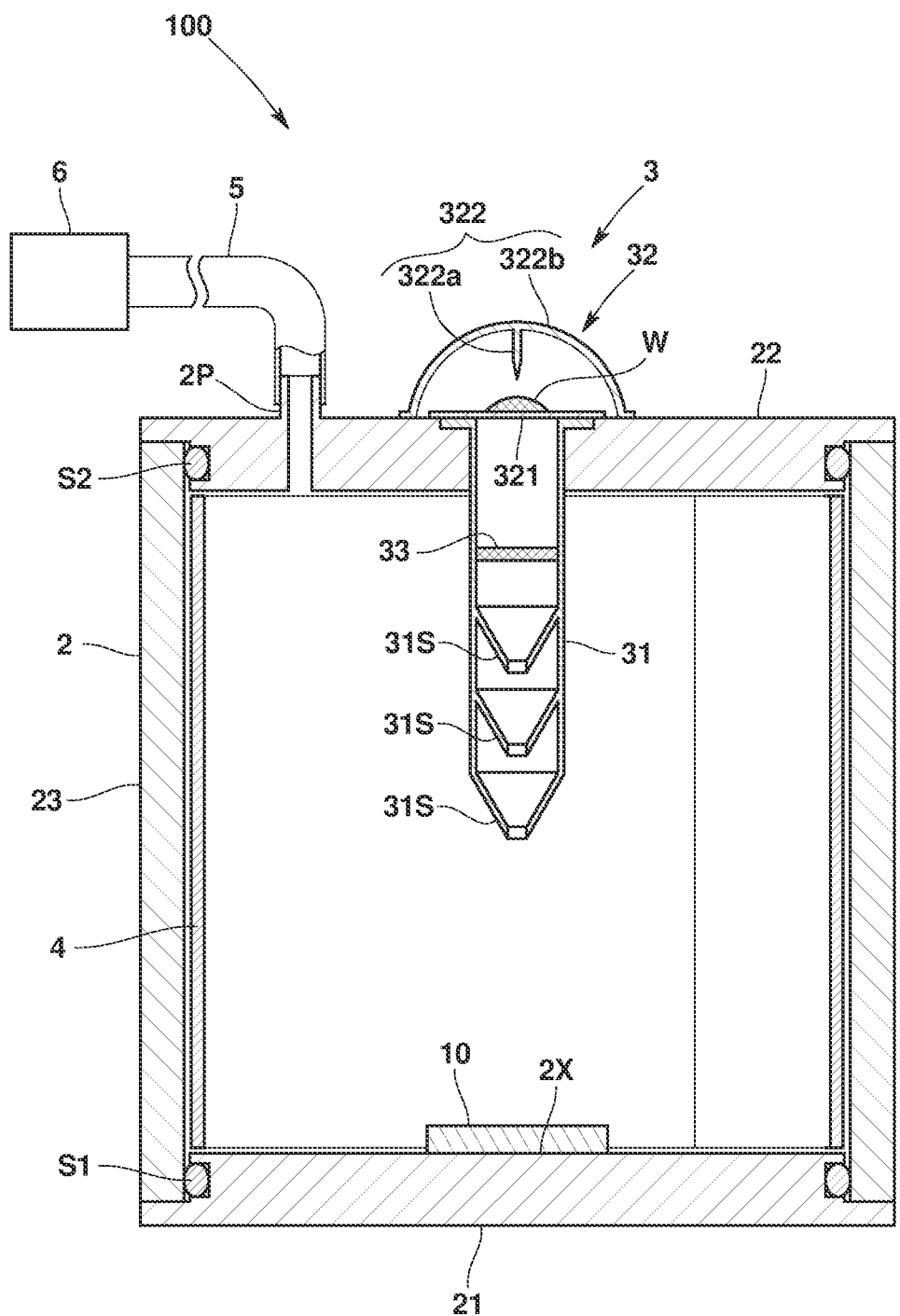
FIG. 5 A schematic diagram showing the sample dispersing device in accordance with a modified embodiment.

In addition, as shown in FIG. 5, one or more mesh members 33 may be provided inside of the introducing tube 31 in the introducing mechanism 3. In addition to the narrowed portion 31S arranged in the introducing tube 31, the mesh member 33 promotes dispersion of the powder sample (W). In FIG. 5, the mesh member 33 is arranged on a vacuum side in the introducing mechanism 3. As mentioned above, since the powder sample (W) that is accelerated inside the introducing tube 31 due to the pressure difference collides with the mesh member 33 by arranging the mesh member 33 on the vacuum side, it is possible to refine the powder sample (W). The mesh member 33 is a mesh filter. This mesh member 33 may be arranged upstream or downstream of the narrowed portion 31S. As the powder sample (W) passes through the mesh member 33, it is possible to disperse the powder sample (W) whose particle size is smaller than the mesh size (mesh opening) of the mesh member 33. This makes it easy to take an observation image free from aggregated particles so that working hours required for the operation can be reduced. In addition, the particles that remain in an aggregated state remain on the mesh member so that it is possible to easily remove the particles that remain in the aggregated state. Furthermore, if a mesh member is changed to a mesh member having a different mesh size, it is possible to set conditions suitable for the power sample (W). In addition, a plurality of mesh members 33 with different mesh sizes may be provided. In this case, it is considered that the mesh members 33 with different mesh sizes are arranged inside of the introducing tube 31 in a descending order of the mesh size starting from the upstream side.

In addition, in the above-described embodiment, the configuration is to place the powder sample (W) on the upper surface of the partition membrane 321 and to introduce the powder sample (W) into the introducing tube 31 by breaking the partition membrane 321 with the membrane breaking portion 322, however, the following configuration is also possible.

The sample dispersing device having this configuration is a sample dispersing device that disperses a powder sample on an upper surface of an analytical member, and comprises a container having a placing surface on which the analytical member is placed, and an introducing mechanism that is arranged in the container and that introduces the powder sample into the container, and the introducing mechanism has an introducing tube inside of which the powder sample is housed and a gas that contains the powder sample is introduced into the container by a pressure difference between the inside and the outside of the container from a state in which the powder sample is housed inside of the introducing tube.

Figure 6:
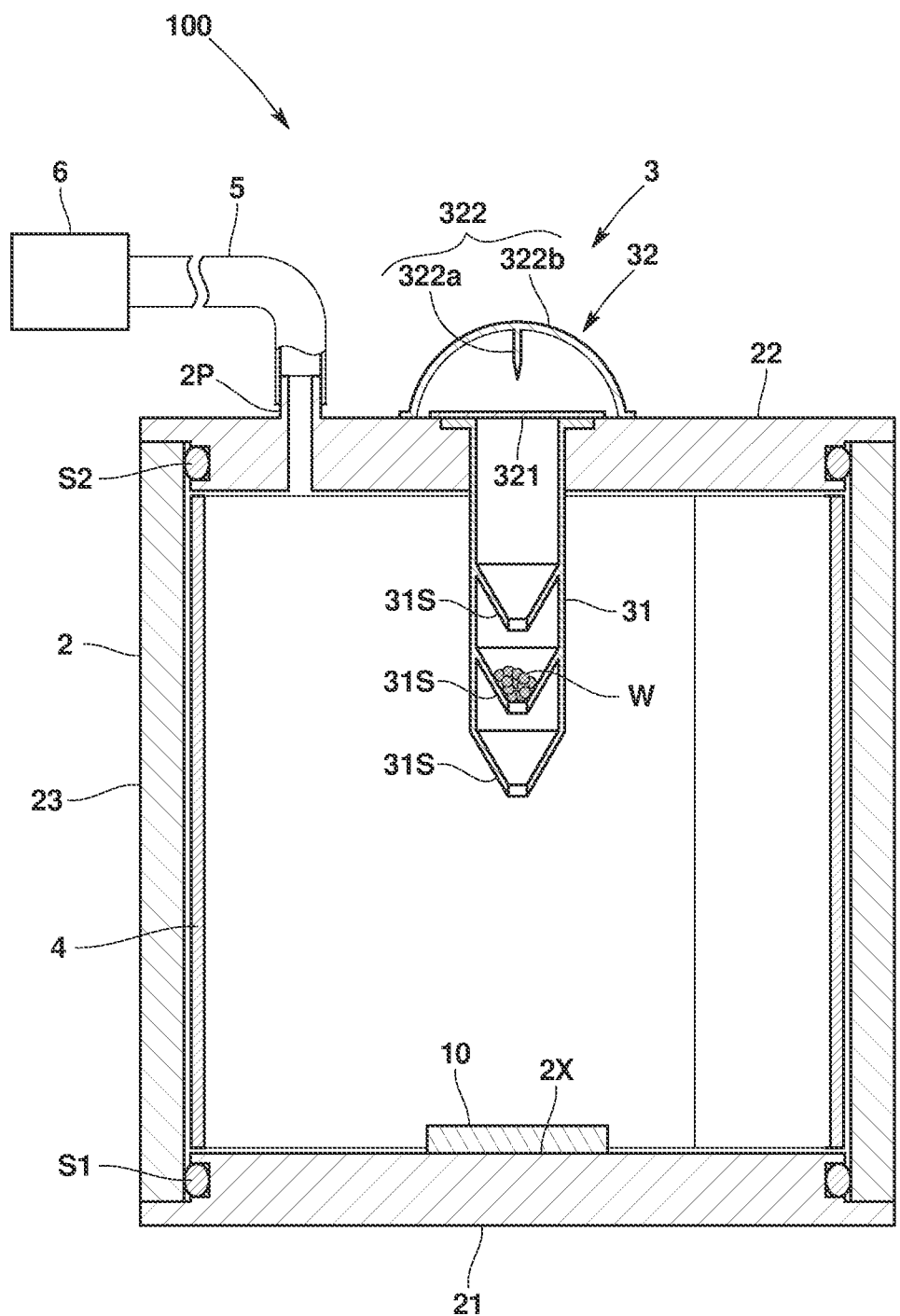
FIG. 6 A schematic diagram showing the sample dispersing device in accordance with a modified embodiment.

Concretely, as shown in FIG. 6, it may be configured that a powder sample (W) is housed inside of the introducing tube 31, and with this state kept, a partition membrane 321 is broken by a membrane breaking portion 322 and the powder sample (W) is introduced into the inside of the container 2. In other words, in a state before the partition membrane 321 is broken, the powder sample (W) housed inside of the introducing tube 31 is in a decompressed state. More specifically, it can be configured that the powder sample (W) is housed in at least one (the second narrowed portion 31S in FIG. 6) of a plurality of the narrowed portions 31S of the introducing tube 31. In FIG. 6, the introducing tube 31 is divided into parts for each of the narrowed portions 31S, and after housing the powder sample (W) in one narrowed portion 31S in a disassembled state, the introducing tube 31 housing the powder sample (W) is formed by assembling the disassembled narrowed portions 31S. If the powder sample (W) comes out of the narrowed portion 31S in case that the powder sample (W) is housed in the narrowed portion 31S, a valve structure or a film may be provided at an opening portion of the narrowed portion 31S.

As mentioned above, the powder sample (W) is housed inside of the introducing tube 31 (narrowed portion 31S), and the partition membrane 321 is broken by the membrane breaking section 322 in a state wherein the container 2 is depressurized, then air flows into the inside of the introducing tube 31 from the outside so that the powder sample (W) is introduced into inside of the container 2. In this embodiment, since the powder sample (W) is not placed on the partition membrane 321, it is possible to solve the problem that the powder sample (W) remains on the partition membrane 321 and the desired amount of dispersion cannot be obtained. In addition, if the powder sample (W) is placed inside of the introducing tube 31, since the shear force that acts on the group of particles in the aggregated state becomes weaker than a case wherein the powder sample (W) is placed on the partition membrane 321 and a distance to the analytical plate 10 can be shortened, it is possible to control the dispersed state of the powder sample (W) and to obtain the powder sample (W) in a desired state (aggregated state or a state wherein a mixed state is maintained).

In the above-mentioned embodiment, the covering member 4 may be provided with a charging mechanism to electrically charge the covering member 4. In this case, if the covering member 4 is electrically charged with the same charge as that of the powder sample (W), it is possible to make the powder sample (W) hardly adhere to the covering member 4 so that the powder particles (W) can be collected on the lower wall portion 21. In addition, if the covering member 4 is electrically oppositely charged from the charge of the powder sample (W), it is possible to make the powder sample (W) easily adhere to the covering member 4 so that the powder sample (W) that has not been dispersed on the analytical plate 10 can be efficiently cleaned by replacing the covering member 4.

The container 2 having the placing surface 2x on which the analytical plate 10 is placed may be made disposable without using the covering member 4 of the above-mentioned embodiment. There is no need of cleaning the container 2 if the container 2 itself is made to be disposable.

In addition, the embodiment may be variously modified or combined without departing from a spirit of the present claimed invention.

DESCRIPTION OF THE CODE

100 . . . sample dispersing device
W . . . powder sample
10 . . . analytical plate (analytical member)
2x . . . placing surface
2 . . . container
21 . . . lower wall portion
22 . . . upper wall portion
23 . . . side wall portion
3 . . . introducing mechanism
31 . . . introducing tube
31S . . . narrowed portion
33 . . . mesh member
4 . . . covering member
7 . . . discharging mechanism

The invention claimed is:

1. A sample dispersing device for dispersing a powder sample on an upper surface of an analytical member, comprising
a container that has a placing surface on which the analytical member is placed,
an introducing opening arranged in the container through which the powder sample is introduced into an inside of the container, and
a covering member that covers an inner surface of the container and prevents scattered powder samples from adhering to the container, the covering member can be attached to and removed from the container, wherein
the container has a lower wall portion having the placing surface on its upper surface, an upper wall portion facing the lower wall portion, and a side wall portion connecting the lower wall portion and the upper wall portion and surrounding the placing surface, and
the covering member is made of an elastic body having a sheet shape that is deformable from a flat state to a cylindrically elastically deformed state having an outer surface and hollow ends, the covering member covers and is fixed in contact with the inner surface of the side wall portion by being arranged in the cylindrically elastically deformed state inside of the side wall portion and expanding due to its elastic return force.

2. The sample dispersing device described in claim 1, wherein
the container is configured so that at least the lower wall portion is separable from the side wall portion.

3. The sample dispersing device described in claim 1, wherein
a discharging mechanism that sucks and discharges the powder sample is arranged on the lower wall portion.

4. The sample dispersing device described in claim 1, wherein
the covering member is made of a material having light transmittance.

5. The sample dispersing device described in claim 1, wherein
the introducing opening introduces a gas containing the powder sample into the container by means of a pressure difference between the inside and the outside of the container, and
the sample dispersing device further includes an introducing pipe connected to the introducing opening through which the gas containing the powder sample flows and which is provided with a plurality of narrowed portions, and one or more mesh members arranged in the introducing pipe.

6. The sample dispersing device described in claim 1, wherein
the covering member is rolled and elastically expanded against the inner surface of the side wall portion.

7. The sample dispersing device described in claim 1, wherein
the outer surface contacts the inner surface of the side wall portion and the hollow ends face the upper wall portion and the lower wall portion when the covering member is fixed in contact with the inner surface of the side wall portion.

8. A sample dispersing method using a sample dispersing device that has a container having a placing surface on which an analytical member is placed and an introducing opening that introduces a powder sample into the container, wherein
the container has a lower wall portion having the placing surface on its upper surface, an upper wall portion facing the lower wall portion, and a side wall portion connecting the lower wall portion and the upper wall portion and surrounding the placing surface, and
the powder sample is introduced into the container through the introducing opening and dispersed on an upper surface of the analytical member in a state wherein an inner surface of the container is covered by a covering member that can be attached to and removed from the container, the covering member being configured to prevent scattered powder samples from adhering to the container, the covering member being made of an elastic body having a sheet shape and covering and fixed in contact with the inner surface of the side wall portion by being arranged in an elastically deformed state inside of the side wall portion and expanding due to its elastic return force, and
the covering member is rolled and elastically expanded against the inner surface of the side wall portion before the power sample is introduced into the container.

9. The sample dispersing method described in claim 8, wherein
the covering member is rolled into a cylindrically elastically deformed state, inserted inside of the side wall portion, and elastically expanded to contact the inner surface of the side wall portion.

* * * * *